Dec. 17, 1946. F. L. BOLTON 2,412,560
PRODUCTION OF SALT BRINE
Filed May 4, 1943 2 Sheets-Sheet 1

Inventor.
F. L. Bolton
By J. K. Bryant,
Attorney.

Dec. 17, 1946.    F. L. BOLTON    2,412,560
PRODUCTION OF SALT BRINE
Filed May 4, 1943    2 Sheets-Sheet 2
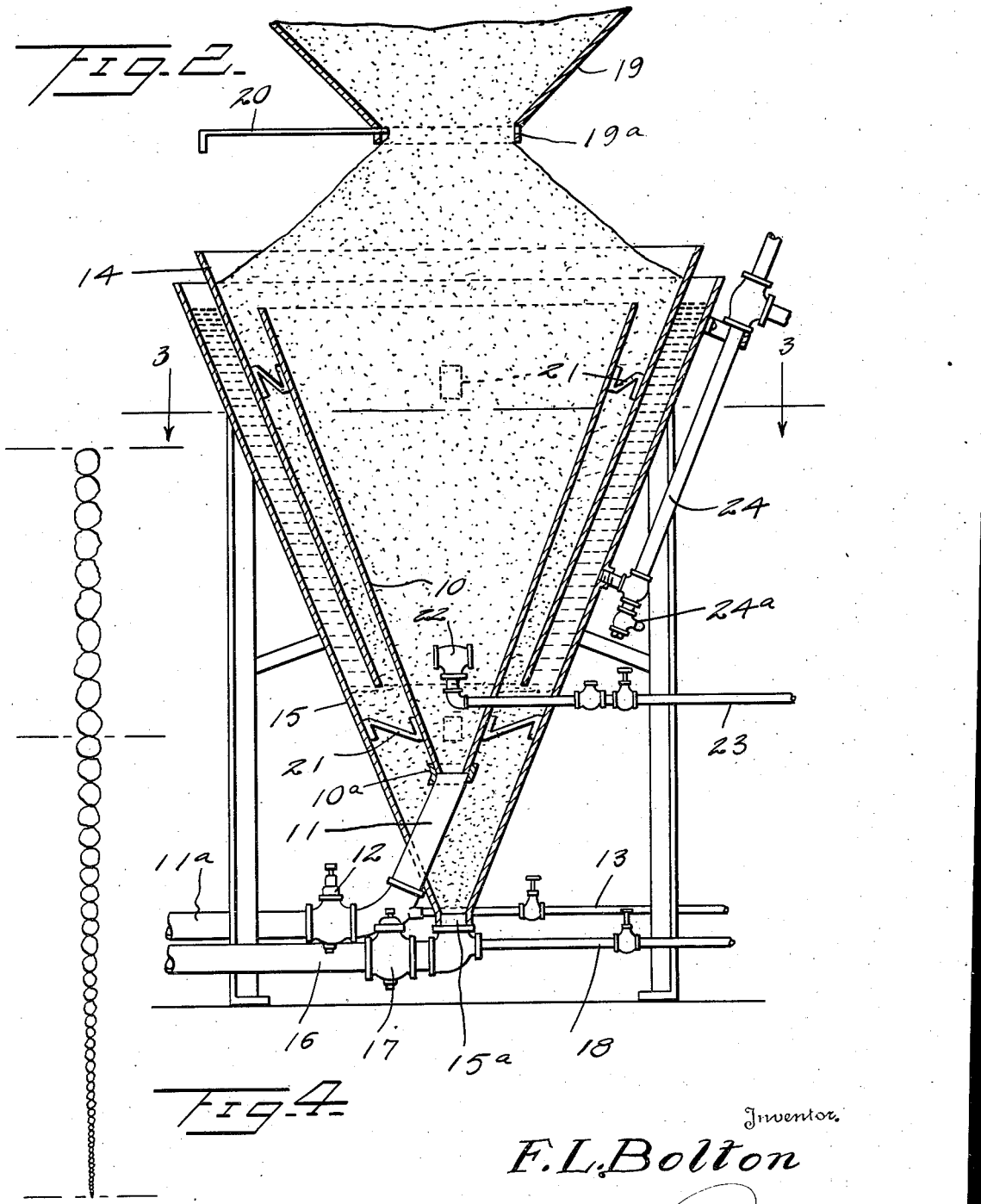

Patented Dec. 17, 1946

2,412,560

UNITED STATES PATENT OFFICE 2,412,560

PRODUCTION OF SALT BRINE

Frank L. Bolton, Ithaca, N. Y.

Application May 4, 1943, Serial No. 485,651

5 Claims. (Cl. 23—310)

This invention relates to improvements in the production of salt brine and pertains more particularly to the production of brine of high physical and chemical properties by the dissolution of commercial grades of rock salt.

Commercial grades of rock salt are the products resulting from crushing and screening the mineral Halite (rock salt) as it comes from the mine. In size, the grains of the commercial grades consist of particles as small as table salt and extending up to one-half inch or more. In composition, the commercial grade grains consist largely of sodium chloride soluble in water, but contain other and smaller amounts of partially-soluble-in-water salts such as calcium sulphate, etc. In addition, the commercial grades of rock salt contain certain insoluble-in-water impurities, consisting of particles which may range in size from the size of a grain of rock salt to minute particles; these insoluble particles are left as sediment when the soluble salts are dissolved, and may include shale particles which may themselves contain small amounts of calcium sulphate; where the latter condition is found, with the calcium sulphate content exposed, the latter content may be dissolved out of the shale with the latter forming part of the sediment.

A very large proportion of commercial grades of rock salt is converted into salt brine before ultimate use in industrial processes, the latter generally utilizing the sodium chloride in its brine form. Hence, various salt dissolving methods and apparatuses have been developed and employed to prepare the brine, the older methods generally consisting in placing rock salt into a tank or vat with water and by some means of agitation, caused dissolution of the salt to take place; methods of agitation varied from paddles operated by hand or machine to jets of steam or compressed air. These methods resulted in a dirty and impure salt brine, not ready for use, since the agitation introduced for the purpose of causing and hastening dissolution, also served to physically contaminate the brine with the insoluble matter, and to chemically contaminate the brine by increasing the solubility of other undesirable soluble salts. Varied methods were used to process this contaminated brine such as by forcing it through canvas to provide filtering out of the insoluble matter, or by passing it through a sand filter, or by allowing the muddy brine to settle in tanks for a long detention period to provide for complete clarification. While these tended to provide physical clarification, such chemical contamination as may have developed, remained. Since many of the uses of the brine also required brine in which the chemical contamination was small or negligible, many of the brines thus developed required additional treatments to remove all or a major portion of the undesired soluble salts which had become contaminating.

Later and more refined methods sought to overcome some of the difficulties by providing tanks where the solvent is passed through a salt bed under somewhat better and partially-controlled conditions, and wherein the former high agitation was made less violent. While these produced an advance in the art of dissolving rock salt, many of the real problems—those pertaining to the elimination of the physical and chemical contamination conditions—remained unsolved or were ineffective to produce satisfactory results, even though elaborate and cumbersome apparatuses have been developed in the hope of meeting these conditions.

The present invention is designed to overcome many of the prior difficulties and provide a superior product in that the brine produced is of high commercial chemical and physical purity, requiring no additional conditioning unless absolute chemical purity is essential in the brine use; in other words, the product is of such high chemical and physical standard as to meet the conditions of the brine usage in a large majority of fields without need of further conditioning—absolute chemical purity is unobtainable in producing brine by dissolution from commercial grades of rock salt, but it is possible to limit contamination of the brine by undesired soluble impurities to negligible values, generally classed under the term of "trace."

The invention centers about the method and apparatus used in producing the dissolution of the solute (rock salt)—the apparatus herein referred to as the dissolver unit, and in which the brine is produced by the introduction of the solvent (fresh water). The underlying characteristic of the method is the fact that the solute and solvent are introduced into and move through the dissolving chamber under conditions of the counter-flow with the solute moving downwardly at an increasing pace and the solvent moving upwardly at a decreasing pace; this places the agitation zone of maximum intensity at a point where it provides for the final dissolution of the solute and where the undissolved solute passes from the path of travel of the brine-producing solvent; the degree of intensity of agitation decreases progressively as the solvent moves upward and is minimum in the upper zone of the dissolving chamber, thus intensifying the agitation as the solute approaches the zone of final dissolution and thereby decreasing the possible time-length within which dissolution of the undesired soluble impurities can be had through contact of the solvent and solute and thereby tending to retain a large percentage of these impurities inert as contaminating sources. In addition, the form of the chamber is such as to tend to cause the solvent movement through the solute to be of the interstitial type to thereby retain the solvent in intimate contact with the surface of the solute grains and provide a more rapid saturation of the solvent and more rapid dissolution of the solute, a condition which is beneficial by decreasing the time-length in which the solvent is active as a dissolving agent for the soluble impurities.

In addition, the dissolving unit is so arranged as to first produce saturation of the solvent and to then filter the saturated solvent, providing these actions in separate chambers with the communication between the chambers provided by overflow of the dissolving chamber; the filtering medium employed is in the form of grains of the solute itself, so that, in the event of incomplete saturation within the dissolving chamber, it can be completed within the filter chamber, thus affording a protection for emergency conditions. The filtered brine is then collected and delivered to the storage tank of the system.

The invention, in operation, not only provides for commercial purity of the product but is of relatively large capacity characteristic, provided by continuity of solute and solvent supply with the constancy of saturation development, thus producing a constant and continuing supply of the brine with the rate of supply determined by the rate of input of the virgin solvent (fresh water). Removal of separated impurities is permitted without stoppage of the brine production, as well as ability to completely cleanse the unit when needed, all resulting in a low cost of operation. These present a few of the characteristics of the invention.

To these and other ends, therefore, the nature of which will be more clearly pointed out as the invention is hereinafter disclosed, said invention consists in the improved methods and the constructions and combinations of parts hereinafter more fully described, illustrated in the accompanying drawings, and more particularly pointed out in the appended claims.

In the accompanying drawings, in which similar reference characters indicate similar parts in each of the views, Figure 1 is a schematic view of one form of brine-producing system contemplated by the present invention.

Figure 2 is a vertical sectional view of a dissolver unit employed in the system.

Figure 4 is a diagrammatic view illustrating the effect on the solute particles of the dissolving action by the solvent during the downward travel of the solute through the dissolving chamber, the view presenting an assumed arrangement of the particles on a vertical axis of the dissolving chamber and of the solute issuing from the storage hopper.

Figure 1:
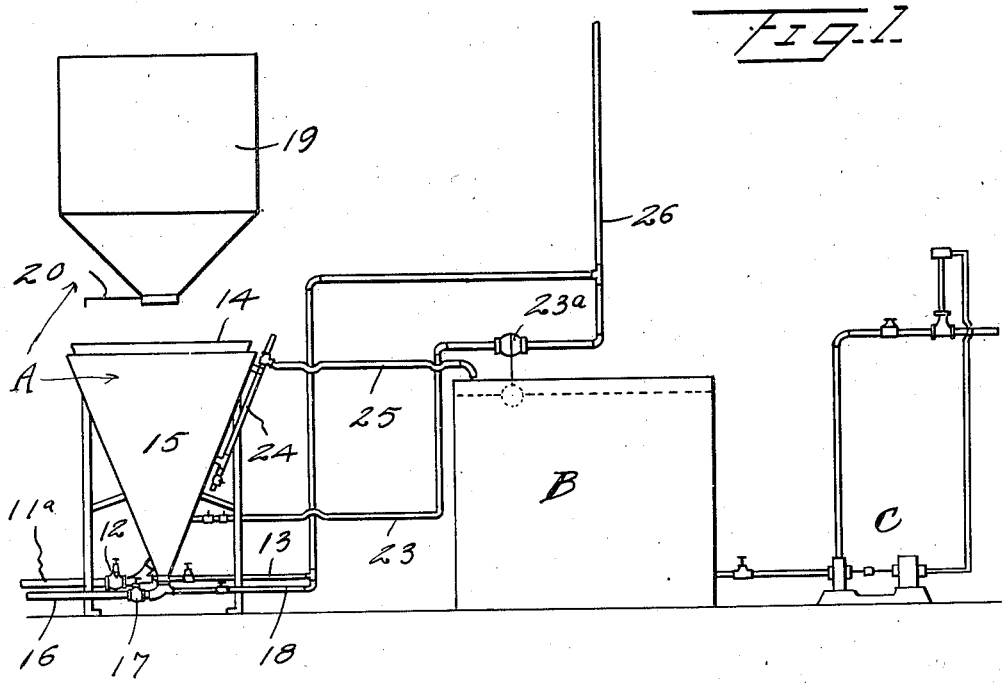
Figure 3:
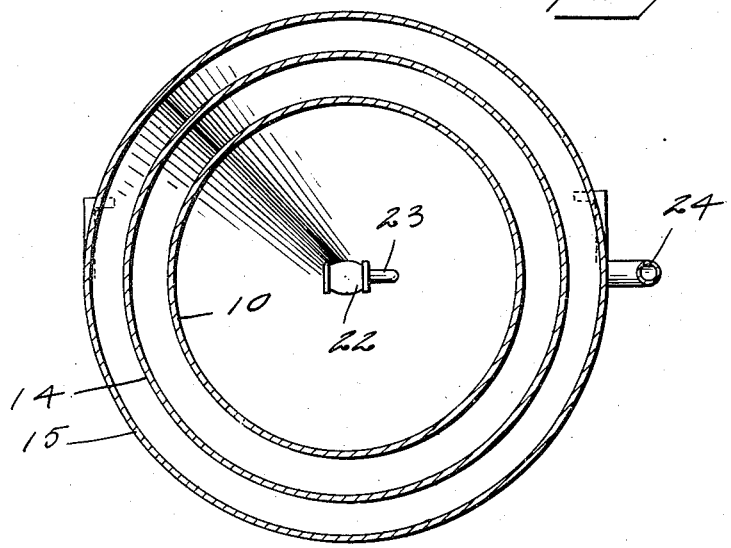
Figure 3 is a sectional view taken on line 3—3 of Figure 2.

The present invention utilizes a number of conditions which become active factors in the successful operation of the system. Some of these are referred to above—others are to be found in the following:

The solute will absorb certain volumes of salt (Englehardt tables) after which further absorption ends and the solvent then serves merely to wet the solute if contact continues.

The dissolution of the calcium sulphate ($CaSO_4$) which may be present in the salt is much lower in rate than that of the salt. Experiments by Bolton and Whitman (1940) demonstrate that the amount dissolved by the solvent about doubles when the contact period is raised from five to twenty minutes, with the amounts at these time lengths indicated as 0.025 of one per cent. of the dry salt for the shorter period, and 0.052 of one per cent. for the longer period. This indicates one of the effects of the increase in time-length of contact of solvent and solute provided by the present invention.

Only the surface of the salt particle is affected by the contact of the solvent and solute particle. Hence, the position of the insoluble matter within the particle determines the time of its actual release from the particle. Since the specific gravity of such impurities is about 1.6 times that of the commercial rock salt, it readily drops by gravitation when released from the particle. And since the size and position of the impurity determines the time of release from the particle, such release generally takes place in the lower portions of the dissolving chamber where the specific gravity of the solvent is in its lower ranges, and the gravitation of the impurities through the solvent is readily had; only minute dimensioned impurities, capable of floating in the solvent move upwardly with the solvent.

Referring first to the construction of the dissolving unit—forming unit A—the numeral 10 indicates an inner conical (inverted) member of sheet form—metal, plastics, or other suitable material—the axis of which extends vertically with the mouth uppermost, and having a truncated lower end to form an outlet 10a of restricted area at the bottom of the member. The conical angle is steep—approximately of twenty-degree angularity to the vertical axis—and formed with a smooth wall. The interior of this member constitutes the dissolving chamber, into which the rock-salt particles are fed from above, as presently explained, the steep smooth side wall not only ensuring continuous feed conditions, but also that the interstitial characteristics will be generally maintained as the particles are reduced in size by the continuing dissolution of the particle surface.

Leading downwardly from outlet 10a is a pipe 11, this pipe—which has some of the characteristics of a sump—is then led laterally, as at 11a, and provided with a valve 12. Pipe 11 is designed to receive the impurities—insoluble and otherwise—which result from the dissolving action, and is provided, in advance of valve 12, with a valved clean-out pipe 13 designed to project a stream of water in the direction of length of the lateral portion 11a when valve 12 is opened, pipe 13 being closed by its valve at other times. This arrangement is designed to flush the dissolver sump from the collected impurities, and will, in practice, be made active frequently, in order to prevent material caking of the content.

Reference character 14 indicates a second conical (inverted) member of larger diameter than member 10, and of generally similar material. Member 14 is arranged concentric to member 10 at a spaced distance therefrom, and may, if desired—and as shown—be of a slightly different tapering angle—tending to provide a slightly tapering distance between the two, with the greater distance at the top. The top of member 14 extends to a plane some distance above the top plane of member 10, as indicated, while the lower end of member 14 is also truncated, but does not extend to the bottom of member 10, the open lower end of member 14 being located some distance above the bottom plane of the dissolving chamber.

Reference character 15 indicates a third conical (inverted) member, of still larger dimensions, the top plane of which is between those of members 10 and 14, and, like member 10, having its lower end truncated to provide an outlet 15a which leads to a laterally-extending pipe 16, also valve controlled, as at 17, and provided with a valve flush-out pipe 18. The members 10, 14 and 15, are held in position by a desired number of suitable spacing braces 21.

This nest of conical members in position is spaced below and preferably axially alined with the hopper outlet 19a of hopper 19, this outlet being controlled by a suitable gate 20. The spacing is such that the particles of rock salt delivered from the hopper will not only fill the dissolving chamber but will also reach into the space between members 10 and 14—hereinafter referred to as a filtering chamber—and will present an angle of repose characteristic of the material being delivered extending sufficiently below the top of member 14 as to reach the filtering chamber but not overflow into the space between members 14 and 15. Hence, the solute—the rock salt—to be treated for dissolution will present a continuous movable content reaching from the hopper to the outlet zones of members 10 and 15, including the dissolving chamber provided by member 10 and the filtering chamber provided by the space between members 10 and 14—as presently explained, the space between members 14 and 15 above the bottom plane of member 14, receives the brine that is being developed. Obviously, therefore, there is a constant weight factor present in connection with the solute and active to move the content downward within the apparatus, as permitted by the dissolving action, the smooth walls and the steep angle ensuring the maintenance of the factor during the operation.

The water for providing the solvent action is introduced into the lower zone of the dissolving chamber through a suitable nozzle formation 22 carried by a supply pipe 23; as presently explained the supply is designed to be automatically controlled, so that suitable valve structures are utilized in pipe 23; it is sufficient at this point of the description, to understand that the nozzle 22 delivers a continuous supply of water under pressure and at a generally constant rate (and preferably laterally of the chamber axis) within the lower zone of the dissolving chamber, the nozzle being located a short distance above outlet 10a, the drawings indicating that it is slightly above the lower plane of member 14, but it may be slightly below such plane.

The structure thus far described, develops the normal operative regimen gradually, as will be understood from the fact that to prepare the structure for service it is necessary to introduce the salt and the water. Initially, with the lower end of the structure closed, the salt is permitted to flow from the supply to the dissolving chamber until the latter—including the sump zone—is filled, the content having the particles of the supply dimensions; as the supply continues and the angle of repose zone develops, it also passes into the filter chamber in which a slight wedging effect develops the lower limit after which the chamber completely fills and the angle of repose zone becomes completely developed. Since the particles of the dissolving chamber are of the supply dimensions, the accumulation differs slightly from that present during normal operation, but, as is apparent, it will present the characteristic of the presence of voids between adjacent particles with the voids having their dimensions based on the dimensions and surface contours of the adjacent particles; the void dimensions, however, are approximately uniform, due to the fact that the tapered wall of the chamber tends to move the particles inwardly as the weight of the particles above tends to force the particles downward.

Hence, when the valve of solvent (water) supply 23 is first opened, with the supply under the desired pressure, the virgin water initially contacts the filled cross-sectional area zone which contains the nozzle 22, and due to the position of the latter in a zone of small area, the full effect of the entering stream is applied to the particles of that area. Since the virgin water has maximum absorption value—the Bolton and Whitman tests (1938) show the dissolution of 312 lbs. of salt per hour by the virgin water—there is rather rapid dissolution action in this zone, reducing particle size and giving greater freedom of action which still further increases the dissolution effect due to the beginning of the development of an agitation zone at such point; the initial water flows downward into the sump and gradually fills the zone below the areal zone of water entrance; the absorption of the dissolved salt begins the development of the concentration values, so that in the portion of the chamber below the nozzle zone, the addition of the water to that portion of the chamber will continue to absorb salt from the particles of this zone, but at the lowering rate shown by the Bolton and Whitman tables, since this water remains as a static accumulation; this action will continue until the particles of this particular portion will become completely dissolved, additional water being added as the particle dimensions are reduced. The final content of this portion is therefore the saturated solvent and any insoluble material which may have been released.

After the lower portion has been filled, the continued addition of the virgin water to the chamber not only develops the agitation chamber but necessarily slowly rises within the chamber; as the chamber cross-sectional area increases, the rate of upward advance grows less due to the larger area which must receive the water content, this advance upwardly continuing until the advance reaches the lip of the chamber, whereupon it begins to overflow into the filter chamber, but the upward advance is at the decreasing rate due to the increasing cross-sectional areas encountered by the water. As the embryo brine passes upward from the agitation zone, it gradually loses its turbulence, after which the upward advance is with the solvent moving quietly. During this upward advance of the solvent, contact is had with the particle surfaces, thus providing dissolving effects on the particle and absorption by the solvent, with the time length required to raise the solvent one percentage point of concentration value gradually increasing, due to the decreasing rate of absorption by the solvent (Bolton and Whitman tests).

However, while the time-length thus increases, there is a compensating effect therefor provided by the decreasing rate of upward advance of the solvent, due to the increasing cross-sectional areas—without the latter the distance of advance to produce the rise of one percentage point would gradually increase, but with the cross-sectional increase the distance of advance remains substantially constant. Since the upward travel of the solvent is through the interstices produced by the voids, the fact that the voids are approximately constant in dimension, aids in producing this compensating effect, due to the fact that the diffusion effect within the voids is kept small— this will be understood from the fact that each void is bounded by a number of particle surfaces each of which is active as a contact surface for direct absorption with the combined surfaces active to provide diffusion in the void, so that there is little loss through diffusion within the void.

This latter condition becomes of value also through the fact that as the solvent advances and increases the concentration value, it thereby increases its specific gravity; hence, in a chamber of considerable depth this increase in weight may exceed 30% between the minimum at the agitation zone and the maximum at the top, a condition which would be disturbing if the chamber content were simply liquid. However, due to the crowding together of particles and the decreasing cross-sectional effect of the chamber wall on the down-travelling particles, the particles of an area aid in withstanding this additional weight, while the small dimensions of the voids present only a negligible weight factor within the void itself.

As the solvent advance develops upwardly from the agitation zone—the virgin water being of lower specific gravity than that of the brine content below that zone produced by the dissolving of the initial salt content of the latter, there is no tendency for the zone to disturb the lower content—and provides the gradually increased concentration values, the particle dissolution development gradually develops a condition such as presented in Fig. 4, the particles growing so small as they approach the agitation zone that the turbulent condition of such zone tends to toss the particles within the zone about freely, and since the solvent is then in its virgin water status, there will be rapid dissolution of such particles, leaving only the insoluble impurities to pass downward into the sump. When this condition is reached, the apparatus is in its normal operative regimen. During the development of the regimen the initial form of the particle accumulation has become changed by the variations in the dissolving action, thus gradually developing the practically stable development shown in Fig. 4, with respect to the changes in dimensions of the particles as they advance downwardly in the chamber. When this is established, the regular and normal regimen becomes complete.

The insoluble impurities pass downwardly when released and accumulate within the sump 11. The accumulation is removed frequently without materially disturbing the normal regimen thus described, by opening the valve in flushing pipe 13 after valve 12 is opened, the pressure of the content of the chamber above and the lower flushing action rapidly moving the accumulation into the drain after which both valves are closed; the sump is rapidly filled from the chamber the content being liquid and thus restoring the normal operating conditions. Such clean-out may take place once or twice a day, depending upon the rapidity of the accumulations; total clean-outs are had only at extended intervals, so that continuous operation is had for extended periods.

As will be understood, the portion of the chamber above the agitation zone is practically filled with the salt particles and the solvent content found in the voids between particles with the voids of approximately similar dimensions due to the constant crowding of particles inwardly due to the inclination of the chamber walls. Hence, the progressive development of concentration value increase tends in the direction of stratification through the approach to uniformity of development of a value within a cross-sectional area stratum. This aids in preventing the development of conditions such as the bubbling upward of the lighter virgin water or of solvent of a lesser specific gravity, or the downward gravitation of heavier solvent through the lower concentration value solvent below, the result being that the solvent of a stratum has generally similar absorptive capacity tending to provide for uniformity in dissolving action within the stratum. As a result, there is little if any loss due to the diffusion action which would be produced by such movements of the different specific gravity portions of the solvent; in view of this the solvent reaches the upper zone of the chamber with its maximum concentration values obtainable by dissolver action, approaching or reaching complete saturation within this upper zone, the result designed for production under normal operation.

It is possible that the latter result would be affected should the salt delivery produce a massing of particles with abnormal amounts of insoluble impurities—this condition would disturb the dissolving action within the massed zone and thus change the width of some of the strata which represent the rise of the concentration value of a percentage point, within such massed zone, thereby delaying the progressive development produced during the normal operation. In such case, the overflow from the chamber would present a temporary slightly lower concentration value—with higher absorptive rate—and thus bring this content to the filter chamber under a more favorable condition for salt dissolution within the latter chamber; under such conditions, the deficiency in concentration values would be provided by salt dissolution within the filter chamber. Normally the salt dissolution within the latter chamber is negligible, and becomes active only when there is a material variation in the concentration values of the solvent overflowing from the dissolving chamber.

Dissolution of soluble impurities will depend somewhat upon their location within the particle. If exposed early in the downward travel of the particle, sufficient time will be had to provide for a considerable percentage of dissolution; where the impurity is buried, it does not become exposed until the particle reaches a lower zone of its travel, thus reducing the time available and lowering the percentage of dissolution accordingly. Since the impurities are heavier than the solvent, the undissolved part—unless floatable— will pass into the sump with the insoluble impurities. In other words, the soluble impurities, when present in the salt supply, will reach the brine product only in liquid form, and the amount thereof will depend upon the position of the impurities within the particle, since there is a time factor present which determines the percentage which is dissolved within the dissolving chamber content which forms the overflow from that chamber; the undissolved portion would have the needed time after reaching the sump, but the brine content of the latter does not reach the brine product.

Hence, the amount of such soluble impurities which may be found within the brine product can be classed as a "trace." As a result, the brine product produced within the dissolver unit forming the present invention is of higher chemical purity than is generally present in dissolver action, and is therefore usable, without treatment, under all commercial conditions where complete elimination is not essential, the brine being classed as commercially pure brine.

From the above, it will be seen that while the solvent and solute are moving in opposite directions within the dissolving chamber (producing the counter-current effect), the particular form of the walls of this chamber—the inverted conical formation—has set up a particular effect on the solute and the solvent as individuals, due to the progressively increasing cross-sectional areas of the chamber in upward direction, with the solute travelling downward and the solvent travelling upward; as the solute particles move downward, they diminish in size and are constantly crowded together—tending to maintain void dimensions—and also move downward at increasing speed due to the decreasing dimensions; as the solvent moves upward, its speed of advance decreases—due to the increasing cross-sectional areas—slowing the upward movement and increasing the time-length of contact. In addition to this action as individuals the solvent and solute action has a number of collective actions brought about through their intimate contact—a number of which have been pointed out above; but there is an additional collective action which is now briefly referred to:

As will be understood, at the instant of initial contact of solute and solvent—within the agitation zone—both are moving at their highest speeds, with the virgin water in its best condition for rapid absorption of the salt solute, so that the solute is dissolved rapidly and the initial stage of concentration value development provided with rapidity, thus not only completing the dissolution of the particles, but also providing an embryo brine zone at the bottom of the chamber above the direct agitation zone, the absorption rate being decreased as the concentration value increases. This characteristic of variations in the speed of advance of both solute and solvent and of the rate of absorption by the solvent, remains constant to the top of the chamber—both speeds of advance decrease upwardly, and the rate of absorption decreases in the same direction. Hence, as the time-length required to raise the concentration value one percentage point increases, due to the decreased rate of absorption, the speed of advance of both solute and solvent is decreased to thereby increase the time-length of solvent travel (while maintaining contact with the solute) to provide such percentage point. This action permits obtaining of time-length of contact within the normal limits of a dissolving unit sufficient to reach the zone of maximum concentration values within the dissolving chamber itself and under continuous operation conditions, doing this with a time-length condition and action such as to largely decrease the contaminating effect of the soluble impurities, a considerable portion of which remain undissolved and reach the sump, as previously described.

As pointed out above, the chamber walls are made symmetrical to a vertical axis, and the plane of the open top of member 10 is perpendicular to such axis. Hence, as the saturated solvent reaches such plane, it will overflow over the entire perimeter of such member and pass into the space between members 10 and 14 in which it will then move by gravitation in contrast with the forced feed conditions within the dissolving chamber. The down-flow of the saturated solution within this space causes the solvent to pass through a lengthy zone of the solute particles similar in dimensions to those present in the hopper and column above the dissolving chamber. Assuming that complete saturation of the solvent will be had prior to the overflow, the solvent will be inactive as a dissolving agent on the particles of this space, but since the downward travel is of the interstitial type, it is apparent that should the overflow take with it any of the insoluble impurities, these will be moved through the particle content—serving as a filtering medium for the solvent—and gradually settle within the filter bed to be cleared out when the interstices are unduly clogged. It is possible that in the course of time there will be an accumulation of such impurities throughout the filter chamber, at which time it is necessary only to flush out the filter chamber by opening valve 17 and the valve of supply-pipe 18 for a few moments, and thus avoid an excess accumulation—once every few months would be sufficient under normal operation.

The brine, thus saturated and filtered, passes beneath the lower end of member 14 and rises within the space between members 14 and 15—since the solute particles have no point of access to the upper end of member 15, this space above the lower plane of member 14 will contain nothing but the filtered brine, the latter rising nearly to the height of the overflow level of member 10, this action being under hydrostatic action due to the open top of the chamber. This space is tapped at a suitable point by an outlet fitting 24 which leads to the brine storage tank or other point under low velocity conditions.

It is apparent that the filter chamber can also act in the capacity of an auxiliary dissolving chamber. For instance, should occasion necessitate an excess production of brine to meet plant operating conditions of a temporary nature, the capacity of the dissolving unit can be increased by increasing the supply of fresh water per unit of time. This will obviously increase the tempo of the upwardly-moving solvent, and if the increase is sufficient can cause the overflow to take place prior to completion of the saturation. In such case, the saturation would be completed during the downward travel of the brine through the filter chamber; this would set up a dissolving action within the filter chamber but at a very slow rate. However, this will not affect the particle supply of the filtering chamber since the open end of the latter is within the angle of repose of the supply column so that a constant supply is always available to maintain the filter chamber in service.

This form of use is not recommended for continuous operation, since the brine produced under these conditions does not have the chemical and physical purity values presented by the unit under normal action, but as a temporary expedient to meet unexpected demands, the unit is serviceable. Where these demands become permanent a unit of larger size should be installed; while the latter provides for an increase in volume of fresh solvent delivered per unit of time, the dimensions of the members 10, 14 and 15, are increased as to top diameter and height so that the solvent and solute movement paces of the smaller unit are practically retained, thus producing the normal and preferred operation.

The dissolver units thus described are generally parts of an installation set up to meet the needs of a plant which employs brine in its operations; Figure 1 illustrates, diagrammatically, a typical installation for the purpose. In this view A indicates the dissolver unit, including the hopper, B indicating the brine tank, the latter receiving its brine from the pipe 24 of the unit through pipe 25. The main water supply, indicated at 26, is tapped to provide the source for flushing pipes 13 and 18, while the connection leading to supply pipe 23 is located relative to the brine tank B in a manner to permit the use of a suitable control valve 23a designed to have its movement controlled from the brine tank; for instance, the control may be of the float type with the float arranged to practically maintain an approximately constant level of brine in the tank. Such an installation permits the dissolver unit to be operated at rates which ensure an adequate supply of the brine by constantly replenishing the tank content by a volume equivalent to that which is being used. A suitable pumping mechanism C, with the usual valves and pressure regulators, leads to the point of use.

One of the advantages of the unit arrangement in which the hopper is spaced above the treatment portion of the unit and over a structure in which the entire upper zone is of the open-top type, is the fact that it is possible to provide a complete "clean-out" of the unit. After long periods of service, it is advisable to provide a complete cleansing of the unit, as by thorough washing out of the various chambers and their walls. With the open top formation, this can be readily done. For instance, when such cleaning is contemplated, the gate 20 is closed and the operation continued—until the top of the solute residue passes below the point where complete saturation of the solvent is had, the conditions remain substantially normal; by reducing the volume of input per unit of time, such saturation point can be lowered farther without affecting the operation since overflow would still continue; this could continue until most of the solute was dissolved; dissolution of much of the solute in the filtering chamber can be had by then overflowing solvent of small or no percentage of saturation—since the purity would be reduced, the product can be retained separate by discharging it through the opening of a valve 24a at the lower end of pipe 24. In this way the unit could be prepared for cleansing without undue loss of the rock-salt content. After thus being prepared, valves 12 and 17 can be opened together with the flushing valves, and then any suitable hose supply be employed at the top of the chambers to completely wash the walls, etc., the water passing out through the drains—this can be done due to the spacing of the hopper outlet, thus affording ready accessibility to the open tops of the chambers. This ability to readily clean out the chambers is facilitated by the steep angularity of the side walls together with the absence of projecting portions, etc.; hence, any tendency of insoluble impurities to adhere to the walls or be caught up into nooks or corners, is avoided, and a thorough cleansing is made possible.

As is apparent from the above, the apparatus and its operation is such as to produce superior results as to concentration values and chemical purity, due to the fact that the knowledge obtained from conditions surrounding the absorption and dissolving activities of the solvent and solute has enabled the development of a dissolver unit in which approximate uniformity in regimen is had under normal conditions, so that under such conditions the brine product produced is approximately constant as to concentration values, and with abnormal conditions the constancy is not materially changed through the possibility of additional dissolving action in the filter chamber as above pointed out; through the comparatively low diffusion action present in the voids of the dissolving chamber and the maintaining of these conditions by the crowding of particles as they grow smaller, the uniformity in development of the increasing concentration values is maintained, so that the values obtained in the dissolving chamber itself are high and maintained. While, in practice, the absorption rate becomes so low in the upper zone of the dissolving chamber that the development of a point-to-point percentage rise ends within such zone because of the long time required to provide such rise, the developed values thus produced are of high percentage type, and of superior chemical purity.

While I have herein disclosed one form of apparatus which may be utilized in practicing the invention, it is obvious that changes or modifications therein may be found essential or desirable in meeting the exigencies of a particular use or the particular desires of a user, and I desire to be understood as reserving the right to make any and all such changes or modifications therein as may be found desirable or essential, insofar as the same may fall within the spirit and scope of the invention as expressed in the accompanying claims, when broadly construed.

What is claimed as new is:

1. In apparatus for the production of brine from salt, the combination of a conical dissolving chamber, having its apex inverted, an open top and normally-closed bottom, a cone shaped member concentrically disposed with respect to said chamber and having an open bottom whereby the member and the chamber enclose an annular space having an unenclosed top and bottom, a second cone-shaped member surrounding said first cone-shaped member and having a normally closed apex whereby to form with the first cone-shaped member an annular vessel having a normally-closed bottom, a liquid outlet connected to the upper portion of said vessel, a solvent inlet extending into said dissolving chamber at the bottom thereof, and a solute supply hopper positioned above said dissolving chamber and so disposed as to be capable of supplying solute to both said dissolving chamber and said annular space.

2. A dissolver unit for the production of brine from salt, comprising a solute supply hopper, three inverted conical shaped members in concentric spaced relationship with open tops thereof positioned below and substantially concentric with an adjustable discharge opening in said hopper at a height permitting continuous flow of the solute particles from said hopper opening at their angle of repose to the intermediate member below the top thereof but above the top of the innermost member, the top of the innermost member being located below the top of the outermost member, and the top of the intermediate member extending above the top of the outermost member, said innermost member extending downwardly and joined at its apex to a conduit passing through the wall of said outermost member, said intermediate member extending downwardly and terminating in an open truncated end above the apex of said innermost member, said outermost member terminating at its apex below said innermost member and joined at its apex to a discharge conduit, a solvent supply conduit extending into the bottom zone of said innermost member, and a brine solution discharge conduit connected to the outermost member and arranged to permit overflow therefrom at a level near the top thereof and above the level of the opening of said solvent supply conduit in said innermost member.

3. A dissolver unit for the production of brine from salt, comprising a solute supply hopper, three inverted conical shaped members in concentric spaced relationship with open tops thereof positioned below and substantially concentric with an adjustable discharge opening in said hopper at a height permitting continuous flow of the solute particles from said hopper opening at their angle of repose to the intermediate member below the top thereof but above the top of the innermost member, the top of the innermost member being located below the top of the outermost member, and the top of the intermediate member extending above the top of the outermost member, said innermost member extending downwardly and joined at its apex to an outlet conduit, said intermediate member extending downwardly and terminating in an open truncated end above the apex of said innermost member, said outermost member terminating at its apex below said innermost member and joined at its apex to a discharge conduit, a solvent supply conduit extending into the bottom zone of said innermost member, and a brine solution discharge conduit connected to the outermost member and arranged to permit overflow therefrom at a level near the top thereof and above the level of the opening of said solvent supply conduit in said innermost member.

4. A dissolver unit for the production of brine from salt, comprising a solute supply hopper, three inverted conical shaped members in concentric spaced relationship with open tops thereof positioned below and substantially concentric with an adjustable discharge opening in said hopper at a height permitting continuous flow of the solute particles from said hopper opening at their angle of repose to the intermediate member below the top thereof but above the top of the innermost member, the top of the innermost member being located below the top of the outermost member, and the top of the intermediate member extending above the top of the outermost member, said innermost member extending downwardly and joined at its apex to an outlet conduit, said intermediate member extending downwardly and terminating in an open truncated end above the apex of said innermost member, said outermost member terminating at its apex below said innermost member and joined at its apex to a discharge conduit, a solvent supply conduit extending into the bottom zone of said innermost member, and a brine solution discharge conduit connected to the outermost member at a point below the upper end thereof and in general proximity of the lower open end of the intermediate member.

5. The method of dissolving a solute which comprises maintaining a supply of solute to substantially fill the inner two of three spaced and concentrically nested conical vessels, introducing solvent within the apex zone of the innermost vessel at such a rate that the solvent will agitate the solute in the apex zone but will become substantially saturated in said innermost vessel, overflowing said solution into the solute-filled annular space between the two inner vessels, passing the solution downwardly within said space and upwardly within the annular space defined by the third vessel at such a rate that the solute within the first annular space will filter out insoluble material in the solution and clear solution will flow upwardly in said second annular space, and withdrawing solution from said second annular space at a point above the point of introduction into the apex of the inner vessel.

FRANK L. BOLTON.